United States Patent
Chowdhury et al.

(10) Patent No.: US 11,175,394 B2
(45) Date of Patent: Nov. 16, 2021

(54) BINARY TO QUAD PHASE GENERATOR

(71) Applicant: RAYTHEON COMPANY, Waltham, MA (US)

(72) Inventors: Erik Chowdhury, Redondo Beach, CA (US); John Michael Heermans, Rancho Palos Verdes, CA (US)

(73) Assignee: Raytheon Company, Waltham, MA (US)

( * ) Notice: Subject to any disclaimer, the term of this patent is extended or adjusted under 35 U.S.C. 154(b) by 357 days.

(21) Appl. No.: 16/367,074

(22) Filed: Mar. 27, 2019

(65) Prior Publication Data
US 2020/0309935 A1 Oct. 1, 2020

(51) Int. Cl.
*G01S 13/28* (2006.01)
*G01S 7/282* (2006.01)

(52) U.S. Cl.
CPC ............ *G01S 13/288* (2013.01); *G01S 7/282* (2013.01)

(58) Field of Classification Search
CPC ....... H04L 7/043; H04B 10/516; H04B 1/707; H04B 10/5167; H04B 1/719; H04B 1/7174; H04B 1/71632; H04B 1/7172; G01S 13/325; G01S 13/87; G01S 19/23; G01S 13/284; G01S 13/288; G01S 7/282
See application file for complete search history.

(56) References Cited

U.S. PATENT DOCUMENTS

| | | | |
|---|---|---|---|
| 4,546,323 A | 10/1985 | Ryu | |
| 4,589,084 A | 5/1986 | Fling et al. | |
| 4,710,772 A | 12/1987 | Cantwell et al. | |
| 4,908,532 A | 3/1990 | Chadwick | |
| 4,937,580 A | 6/1990 | Wills | |
| 5,255,288 A | 10/1993 | Ichihara | |
| 5,719,579 A | 2/1998 | Torre et al. | |
| 5,903,555 A | 5/1999 | Wildauer et al. | |
| 6,021,422 A | 2/2000 | Schwarz | |
| 6,055,554 A | 4/2000 | Schwarz | |
| 6,313,782 B1 * | 11/2001 | Lehan | G01S 7/35 342/159 |
| 6,587,072 B1 | 7/2003 | Gresham et al. | |
| 6,735,238 B1 | 5/2004 | McCorkle | |
| 6,917,327 B2 | 7/2005 | Jenkins | |
| 6,985,049 B2 | 1/2006 | Hyoung et al. | |
| 7,010,056 B1 * | 3/2006 | McCorkle | H04B 1/7172 375/286 |

(Continued)

FOREIGN PATENT DOCUMENTS

| | | |
|---|---|---|
| CN | 101813768 A | 8/2010 |
| CN | 105093190 A | 11/2015 |

*Primary Examiner* — Olumide Ajibade Akonai
(74) *Attorney, Agent, or Firm* — Lewis Roca Rothgerber Christie LLP

(57) ABSTRACT

A system for generating a pulse. In some embodiments, the system includes a processing circuit configured: to reverse the sign of a first group of two consecutive bits of a binary code word; to calculate three phase change bits, of a plurality of phase change bits, according to $(-1)^n$ k(n)/k(n-1) wherein k(n) is the $n^{th}$ bit of the binary code word, n being a positive integer ranging from 2 to 4, and to generate a phase modulation function for a pulse including a sequence of consecutive chips.

20 Claims, 13 Drawing Sheets

(56) References Cited

U.S. PATENT DOCUMENTS

| | | | |
|---|---|---|---|
| 7,197,522 B2 | 3/2007 | Mallinson | |
| 7,457,836 B2 | 11/2008 | Mallinson | |
| 7,646,333 B2 * | 1/2010 | Shoemaker | G01S 13/222 |
| | | | 342/120 |
| 7,965,103 B2 | 6/2011 | Whetsel | |
| 9,575,160 B1 * | 2/2017 | Davis | G01S 7/023 |
| 10,015,038 B1 | 7/2018 | Midya et al. | |
| 2009/0232197 A1 * | 9/2009 | Mimura | H04L 25/4904 |
| | | | 375/239 |
| 2017/0322289 A1 * | 11/2017 | Benneckenstein | G01S 7/4052 |
| 2018/0088224 A1 * | 3/2018 | Kishigami | G01S 7/02 |
| 2020/0150256 A1 * | 5/2020 | Dent | H01Q 19/175 |

* cited by examiner

BINARY TO QUAD PHASE GENERATOR

FIELD

One or more aspects of embodiments according to the present invention relate to waveform generation, and more particularly to a system and method for generating a quad phase modulated waveform.

BACKGROUND

Pulse compression is used in commercial and military radar systems for generating fine range resolution waveforms, which may improve system sensitivity by increasing the time on target. A quadrature phase coded radar pulse waveform may have useful properties for pulse compression applications, including less susceptibility to out of band noise. Generating such a waveform, however, may be processing-intensive.

Thus, there is a need for an improved system and method for generating a quad phase modulated waveform.

SUMMARY

In some embodiments of the present disclosure, there is provided a system for generating a pulse, the system including: a processing circuit configured to: calculate a modified code word, the calculating of the modified code word including reversing the sign of a first group of two consecutive bits of a binary code word; and calculate three phase change bits, of a plurality of phase change bits, according to $(-1)^n k(n)/k(n-1)$ wherein $k(n)$ is the $n^{th}$ bit of the binary code word, n being a positive integer ranging from 2 to 4, and generate a phase modulation function for a pulse having a sequence of consecutive chips, the phase modulation function being based on the phase change bits, the phase modulation function having: a second phase value within a second chip of the sequence of consecutive chips, the second chip immediately following the first chip and corresponding to the second phase change bit; and a third phase value within a third chip of the sequence of consecutive chips, the third chip corresponding to the third phase change bit, wherein: the second phase value differs from the first phase value by a constant times the second phase change bit, and the third phase value differs from the second phase value by the constant times the third phase change bit, the system further including a waveform generating circuit connected to the processing circuit, the waveform generating circuit being configured to produce a phase-modulated waveform having a phase modulation corresponding to the phase modulation function.

In some embodiments, the processing circuit is further configured to set a first phase change bit of the plurality of phase change bits to be equal to a first bit of the binary code word, the first phase change bit being the first-in-order phase change bit among the plurality of phase change bits, and the first bit of the binary code word being first-in-order among the bits of the binary code word.

In some embodiments, the first phase change bit corresponds to a first chip immediately preceding the second chip.

In some embodiments, the second chip is the first-in-order chip among the sequence of consecutive chips.

In some embodiments, the binary code word is a fixed binary code word.

In some embodiments, the binary code word is a pseudorandom noise code.

In some embodiments, the waveform generating circuit includes a cosine table.

In some embodiments, the processing circuit is further configured to generate the phase modulation function as a plurality of phase values within each chip, the phase values forming a sequence approximating a continuous monotonic function within the first chip, a point on the continuous monotonic function within the first chip being equal to the first phase value.

In some embodiments, the continuous monotonic function is a piecewise linear function.

In some embodiments, the continuous monotonic function is a linear function.

In some embodiments, the waveform generating circuit includes: a carrier tone generator; a phase shifter; and a controllable phase interpolator, configured to be controlled by the processing circuit.

In some embodiments of the present disclosure, a method for generating a pulse, the method including: reversing the sign of a first group of two consecutive bits of a binary code word; and calculating three phase change bits, of a plurality of phase change bits, according to $(-1)^n k(n)/k(n-1)$ wherein $k(n)$ is the $n^{th}$ bit of the binary code word, n being a positive integer ranging from 2 to 4, and generating a phase modulation function for a pulse including a sequence of consecutive chips, the phase modulation function being based on the phase change bits, the phase modulation function having: a second phase value within a second chip of the sequence of consecutive chips, the second chip immediately following the first chip and corresponding to the second phase change bit; and a third phase value within a third chip of the sequence of consecutive chips, the third chip corresponding to the third phase change bit, wherein: the second phase value differs from the first phase value by a constant times the second phase change bit, and the third phase value differs from the second phase value by the constant times the third phase change bit.

In some embodiments, the method further includes setting a first phase change bit of the plurality of phase change bits to be equal to a first bit of the binary code word, the first phase change bit being first-in-order among the plurality of phase change bits, and the first bit of the binary code word being first-in-order among the bits of the binary code word.

In some embodiments, the first phase change bit corresponds to a first chip immediately preceding the second chip.

In some embodiments, the second chip is the first-in-order chip among the sequence of consecutive chips.

In some embodiments, the binary code word is a Barker binary code word.

In some embodiments, the binary code word is a pseudorandom noise code.

In some embodiments, the method further includes generating the phase modulation function as a plurality of phase values within each chip, the phase values forming a sequence approximating a continuous monotonic function within the first chip, a point on the continuous monotonic function within the first chip being equal to the first phase value In some embodiments, the continuous monotonic function is a piecewise linear function.

In some embodiments, the continuous monotonic function is a linear function.

BRIEF DESCRIPTION OF THE DRAWINGS

Features, aspects, and embodiments are described in conjunction with the attached drawings, in which.

DETAILED DESCRIPTION

The detailed description set forth below in connection with the appended drawings is intended as a description of exemplary embodiments of a quad phase generator provided in accordance with the present invention and is not intended to represent the only forms in which the present invention may be constructed or utilized. The description sets forth the features of the present invention in connection with the illustrated embodiments. It is to be understood, however, that the same or equivalent functions and structures may be accomplished by different embodiments that are also intended to be encompassed within the scope of the invention. As denoted elsewhere herein, like element numbers are intended to indicate like elements or features.

Figure 1:
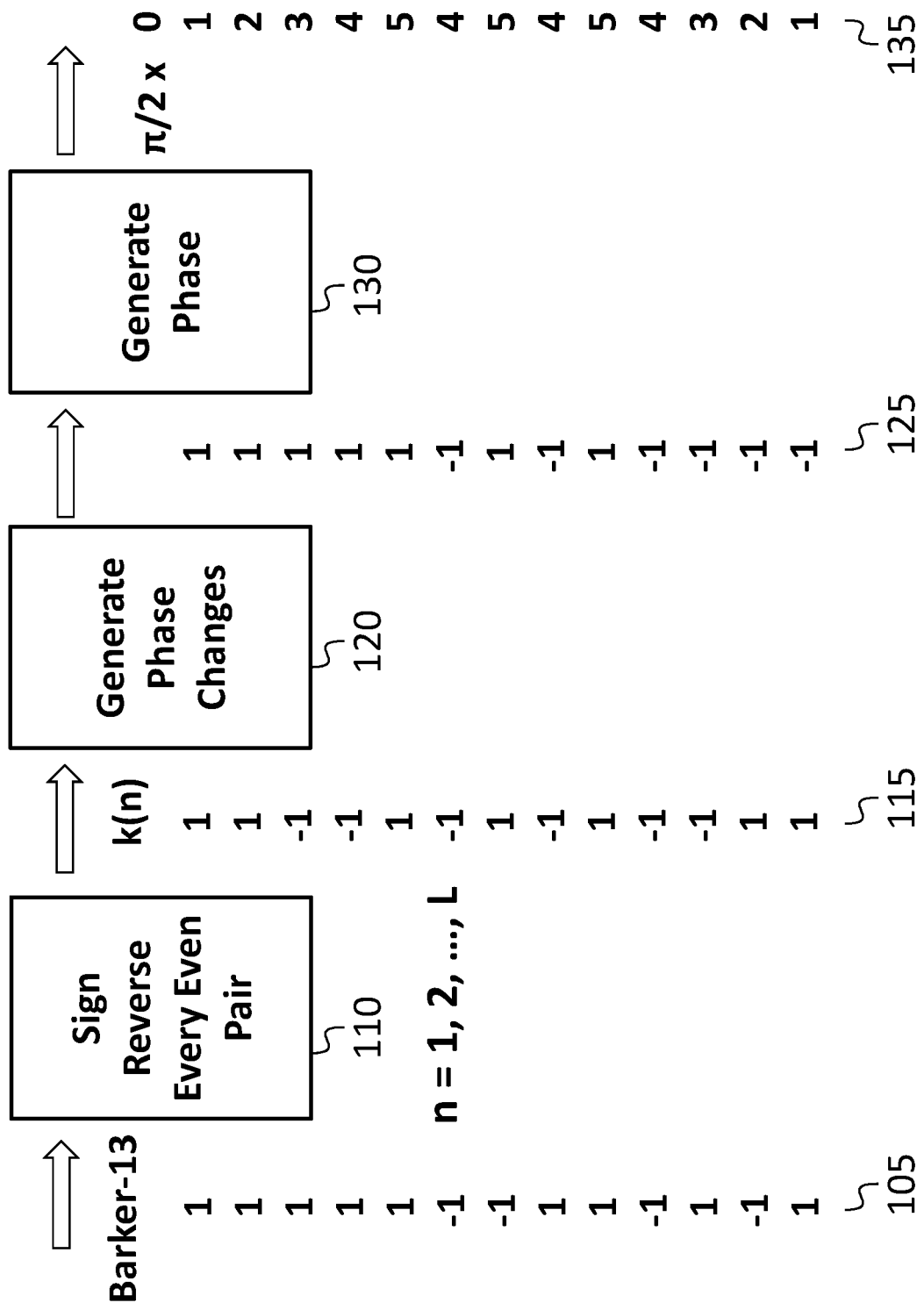
FIG. 1 is a data flow diagram, according to an embodiment of the present invention.

Referring to FIG. 1, in some embodiments a quad phase generator may receive a binary code word 105 and process it as follows, to generate a corresponding sequence of phase values. First, in a sign-reversal operation 110, the sign of each even pair of bits is reversed, to form an intermediate (or "modified") code word 115, which may be referred to as k(n), with n ranging from 1 to L, L being the length of the binary code word 105. For example, in the sign-reversal operation 110, the first two bits of the binary code word 105 (i.e., the two bits of the first pair) may be left unchanged, the third and fourth bits (i.e., the two bits of the second pair) may be reversed, the fifth and sixth bits (i.e., the two bits of the third pair) may be left unchanged, and so on. The operation of one embodiment is illustrated in FIG. 1 for a binary code word that is a 13-bit Barker code; in some embodiments other binary code words (e.g., a pseudorandom noise code, as discussed in further detail below).

In other embodiments, the sign-reversal operation 110 instead reverses the sign of each odd pair of bits, to form the intermediate code word 115. In such an embodiment, in the sign-reversal operation 110, the first two bits of the binary code word 105 (i.e., the two bits of the first pair) may be reversed, the third and fourth bits (i.e., the two bits of the second pair) may be left unchanged, the fifth and sixth bits (i.e., the two bits of the third pair) may be reversed, and so on.

Next, in a phase change generation operation 120, the quad phase generator may generate a sequence of phase change bits 125 according to the equations:

$$d(1)=k(1)$$

$$d(n)=(-1)^n k(n)/k(n-1) \text{ for } n=2 \ldots L.$$

In some embodiments, the sign of these equations may be inverted, so that the following equations may be used instead:

$$d(1)=-k(1)$$

$$d(n)=(-1)^{n+1} k(n)/k(n-1) \text{ for } n=2 \ldots L.$$

In some embodiments, d(1) is omitted, and the sequence of phase change bits begins with d(2).

In a phase generation operation 130, the quad phase generator may then calculate the phase of a sequence of phase values 135, which may be calculated according to the following equation:

$$p(0)=0$$

$$p(n)=p(n-1)+m\ d(n)$$

where m is the phase slope, e.g., pi/2.

The phase values may then determine the phase, as a function of time, of a phase-modulated waveform in a pulse. The pulse may include a plurality of sub-pulses, or "chips", each chip being a time interval, within the pulse, corresponding to a different value of n. Within each chip, the phase may change by an amount proportional to the phase change bit corresponding to the chip, and, as a result, the phase of each one of the sequence of phase values 135 may be the phase value at the end of a corresponding chip. The phase of the phase-modulated waveform, as a function of time, may be referred to as the "phase modulation function".

Figure 2:
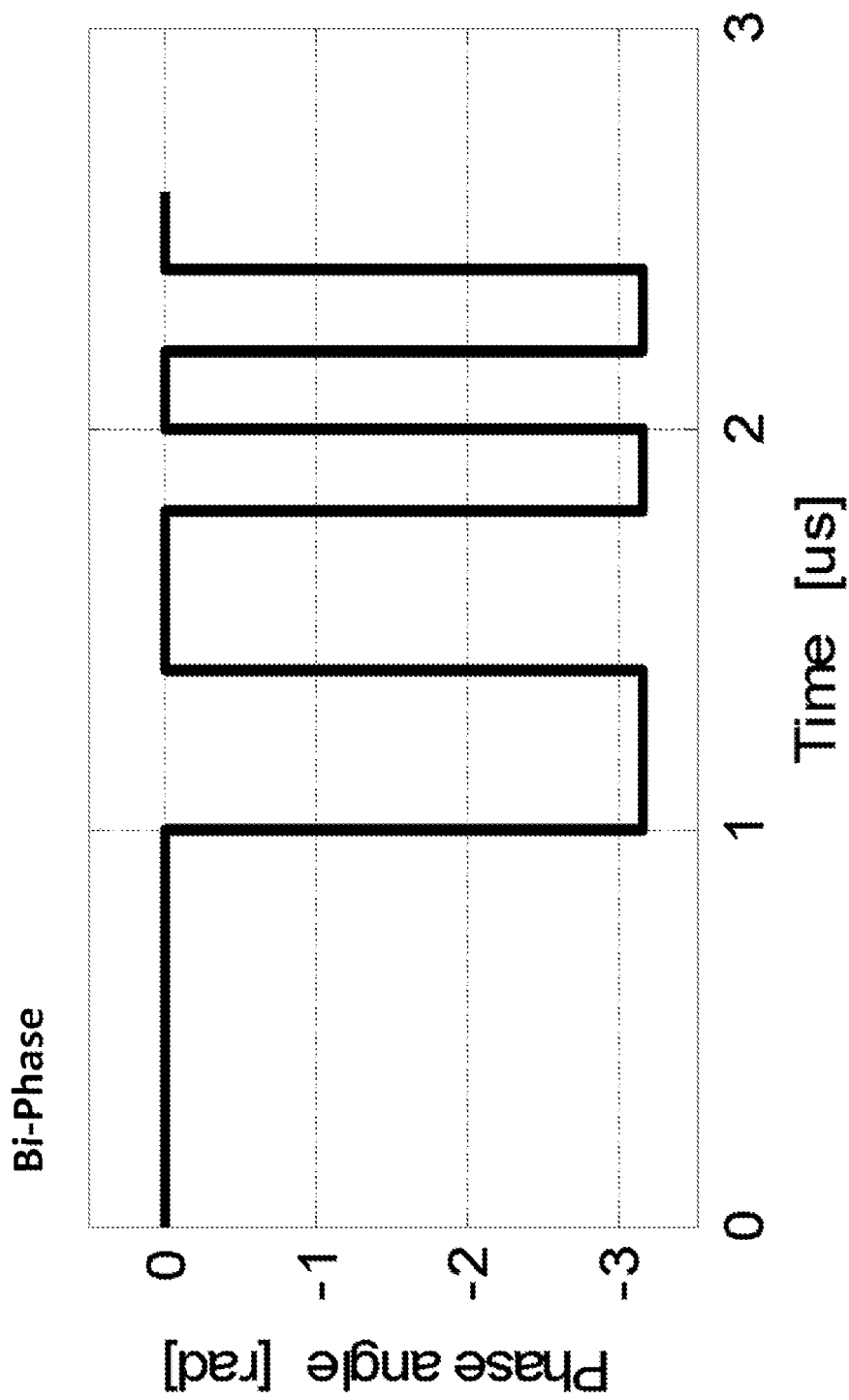
FIG. 2 is a graph of a phase modulation function, according to an embodiment of the present invention.
Figure 3:
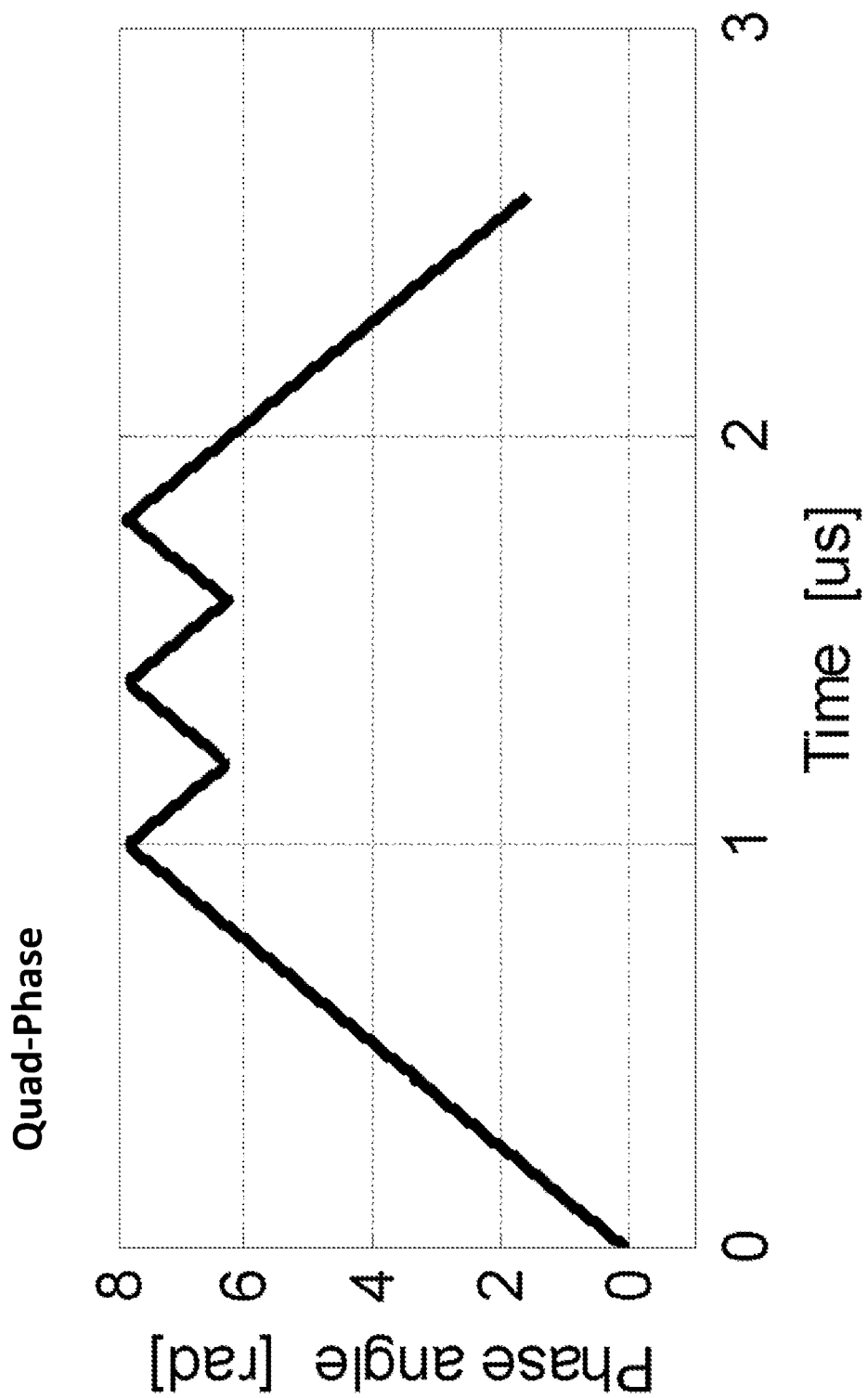
FIG. 3 is a graph of a phase modulation function, according to an embodiment of the present invention.

FIG. 2 shows a bi-phase phase modulation function that may result from direct use of the binary code word 105 for bi-phase modulation. In some embodiments, the binary code word corresponding to a 13-bit Barker code (the "Barker-13" input that is shown also in FIG. 1) may be converted, using the method shown in FIG. 1, to the continuous, quad phase, phase modulation function of FIG. 3, which may provide superior performance (e.g., in a radar system) to the bi-phase phase modulation function of FIG. 2). In FIGS. 2 and 3, the example pulse has a duration of 2.6 microseconds, and each chip, of the 13 chips in the pulse, has a duration of 200 ns. The phase modulation function of FIG. 3 has the characteristic that the phase at the end of each chip (each chip having a duration of 200 ns) is the phase value, of the sequence of phase values 135 shown in FIG. 1, corresponding to the chip, where the second phase value of the sequence of phase values 135 corresponds to the first chip, the third phase value of the sequence of phase values 135 corresponds to the second chip, and so on, and the first phase value of the sequence of phase values 135, i.e., zero (0), is the value at the beginning of the first chip, as shown in FIG. 3. In an embodiment resulting in the phase modulation function of FIG. 3, the phase changes at a constant rate within each chip, the rate being pi/(2 T) times the phase change bit 125 corresponding to the chip, where T is the length of the chip (i.e., 200 ns in the example of FIGS. 2 and 3).

In other embodiments, the phase may change, within each chip, according to a different function than one having a constant slope. For example, the phase modulation function may change abruptly (i.e., discontinuously) within the chip, or it may change in a manner that is piecewise linear. A piecewise linear function may for example be constant within a first portion of the chip, and have a constant slope within a second portion of the chip, the second portion immediately following the first portion, and the slope within the second portion being selected such that the phase change within the second portion equals the phase change value (of the sequence of phase values 135) corresponding to the chip. In another example, a piecewise linear function may change, linearly, within a first portion of the chip, to the final phase value for the chip, and remain constant within a second portion of the chip.

Figure 4:
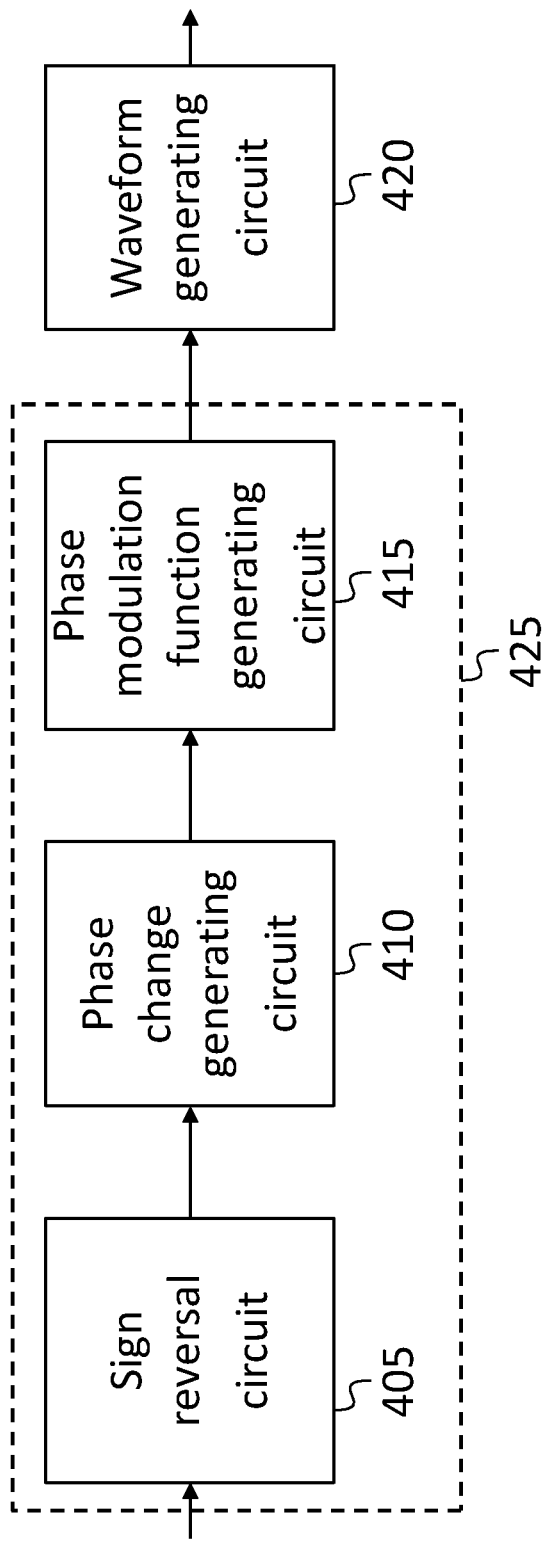
FIG. 4 is a block diagram, according to an embodiment of the present invention.

In some embodiments, a phase-modulated pulse is generated by the circuit shown in FIG. 4. A sign reversal circuit 405 receives a binary code word and performs the sign-reversal operation 110 of the embodiment of FIG. 1. A phase change generating circuit 410 then performs the phase change generation operation 120 of the embodiment of FIG. 1, and a phase modulation function generating circuit 415 generates a phase modulation function which includes at least one phase value for each chip of the pulse, and may include a plurality of phase values (e.g., to approximate a continuously changing phase value, such as that shown in FIG. 3). In some embodiments, the phase modulation function generating circuit 415 generates phase values at a "sample rate" that may be 40 times or 80 times the chip rate, i.e., at a sample rate of 200 MHz or 400 MHz for a chip rate of 5 MHz (i.e., a chip length of 200 ns). The quality of the approximation of the continuously changing phase value may be such that the output of the phase modulation function generating circuit 415 may differ by less than pi/10 or by less than pi/100 from a continuous monotonic function (e.g., from a linear, or piecewise linear, function). A waveform generating circuit 420 may then generate the phase-modulated pulse waveform.

The phase modulation function generating circuit 415 may generate a sequence of digital values approximating a continuous phase modulation function. For example, it may generate a sequence of 16-bit digital values, each representing an unsigned integer, proportional to a phase, scaled such that the integer 0 corresponds to a phase of 0 and such that the integer consisting of 16 ones corresponds to 65535/65536 times 2 pi. In such an embodiment, the phase modulation function generating circuit 415 may include a 16-bit phase register, and it may, for each cycle of a sampling clock (that runs at the sample rate) add a phase change value to or subtract a phase change value from the phase register, the phase change value being constant or depending on the time within the chip, the phase change value being added to the phase register when a phase change bit received from the phase change generating circuit 410 is a binary 1, and the phase change value being subtracted from the phase register when a phase change bit received from the phase change generating circuit 410 is a binary 0 (or a binary "−1" in the terminology of FIG. 1).

It will be understood that each output bit of the phase change generating circuit 410 is a value of 1 or −1, which may be represented by binary 1 and binary 0, respectively, in a digital circuit. In an embodiment in which the phase change value added or subtracted is constant, the phase change value may be, for example, $2^q t/(4T)$, where q is the number of bits in the phase register, t is the sampling clock period, and T is (as above) the chip length. In some embodiments the phase change value may not be an integer, and the phase register may be a fixed point register with the number of bits to the right of the binary point being selected to reduce, to an acceptable extent, the rounding error incurred in calculating the phase change value. In such an embodiment, the phase change value may be calculated as $2^q t/(4T)$, with q being the number of bits, in the phase change register, to the left of the binary point. In some embodiments the phase register may store an integer, and any rounding error may have only a small (and acceptable) effect on the performance of the system.

The phase modulation function generating circuit 415 may be configured to discard any overflow or underflow when the phase register is increased beyond its maximum value (e.g., 65535 for a 16-bit phase register) or decreased below its minimum value (e.g., 0). This ignoring of the overflow or underflow may be acceptable if the phase value is scaled such that the full range of values corresponds to 2 pi, since increasing the phase value by a fixed amount beyond 2 pi results in a phase that is greater than 0 by the fixed amount.

In some embodiments the phase modulation function generating circuit 415 also includes a sample counter that is reset at the beginning of each chip, and that is used to select the phase change value. For example, in a phase modulation function generating circuit 415 that produces a piecewise linear phase modulation function, the phase change value may be zero when the sample counter is less than ½ of the number of samples in a chip, and it may be $2^q t/(2T)$ (i.e., twice the value in the example above) when the sample counter is greater than ½ the number of samples in a chip. The combination of the sign reversal circuit 405, the phase change generating circuit 410, and the phase modulation function generating circuit 415 may be referred to as a "quad phase generator" 425.

Figure 5:
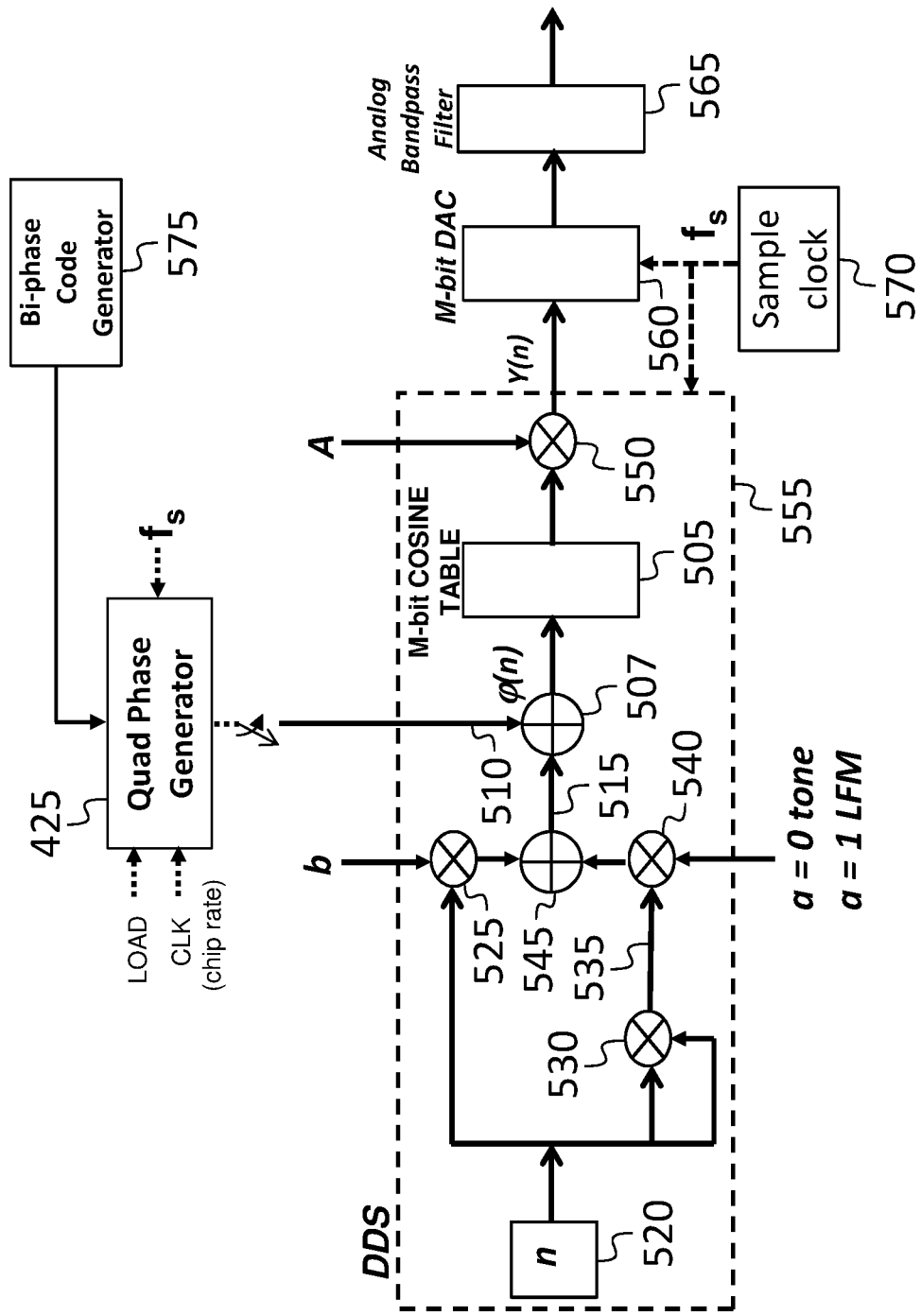
FIG. 5 is a block diagram, according to an embodiment of the present invention.

In some embodiments the waveform generating circuit 420 is a direct digital synthesizer. Referring to FIG. 5, the direct digital synthesizer 555 may include a cosine table 505, the input to which is the current phase (i.e., in which the address read out is proportional to the current phase), and the output from which is the current point in the waveform of the pulse. The current phase may be the sum, formed in a first adder 507, of the phase modulation function 510 and a "carrier phase" 515 which may be a phase value that advances continuously, e.g., at a constant rate proportional to the carrier frequency of the pulse, for a constant frequency carrier, or at a variable (e.g., increasing or decreasing) rate, for a varying-frequency carrier, such as a chirped carrier.

The carrier phase 515 may be generated by a sample counter 520, the output of which may be multiplied, in a first multiplier 525, by a first constant, "b", proportional to the carrier frequency, to form a scaled counter value. The output of the sample counter 520 may also be multiplied by itself, in a second multiplier 530, to form a sequence of numbers 535 that increases at a constantly-increasing rate. The sequence of numbers 535 may be multiplied, in a third multiplier 540 by a control value "a", and added, in second adder 545, to the scaled counter value. When the control value "a" is set to 0, the carrier phase 515 increases at a constant rate; when it is set to 1 (or another positive value), the carrier phase 515 increases linearly with time, so that a linearly frequency modulated (LFM) signal (further modulated by the phase modulation function) is generated. As discussed above in the context of the phase modulation function generating circuit 415, arithmetic preceding the cosine table 505 in the direct digital synthesizer 555 may be performed using modulo-$2^q$ arithmetic (i.e., overflows)

when a result exceeds 2^n−1, may be discarded, if the cosine table 505 has 2^n entries defining one full cycle of a cosine function.

The output of the cosine table 505 may be multiplied, in a fourth multiplier 550, by an amplitude factor A, to form the output Y(n) of the direct digital synthesizer 555. The output of the direct digital synthesizer 555 may be fed into a digital-to-analog converter 560, the output of which may be filtered by an analog bandpass filter 565. A sample clock 570 may supply a clock signal, having a frequency $f_s$ (the sampling rate), to some or all of the digital circuits as shown. A bi-phase code generator 575 may supply, to the quad phase generator 425, a sequence of binary code words, each of which is then converted, by the quad phase generator 425, to a phase modulation function. The cosine table 505 may store values of the cosine of the address (scaled to radians) or it may store values of the sine of the address, or values of a linear combination of a sine and a cosine. As used herein, a "cosine table" stores B cos(x+C) where x is the address, scaled to radians, and B and C are constants.

In some embodiments, phase modulation may be accomplished by other methods. For example, a phase-shifted copy of the carrier signal may be formed (e.g., the carrier signal may be split by a power splitter, and one output of the power splitter may be fed into a phase shifter or delay), and the carrier signal and its phase-shifted copy may be fed into a circuit for forming a linear combination of the two signals, the proportions of the linear combination being electronically controllable. Such a circuit may be referred to as a phase interpolator and may include, for example, one or two variable gain amplifiers or variable attenuators, and a power combiner. It may also include a processing circuit driving a digital to analog converter, the processing circuit being configured (using suitable calibration data) to calculate and generate one or more control voltages (e.g., for variable gain amplifiers) that result in an output phase corresponding to a phase command (e.g., a point in the phase modulation function) received by the processing circuit. In such an embodiment the carrier may be generated by a direct digital synthesizer or by a different source, such as a phase-locked loop.

In FIG. 4, the sign reversal circuit 405, the phase change generating circuit 410, and the phase modulation function generating circuit 415, as well as part of the waveform generating circuit 420, are implemented as one or more processing circuits.

Figure 6A:
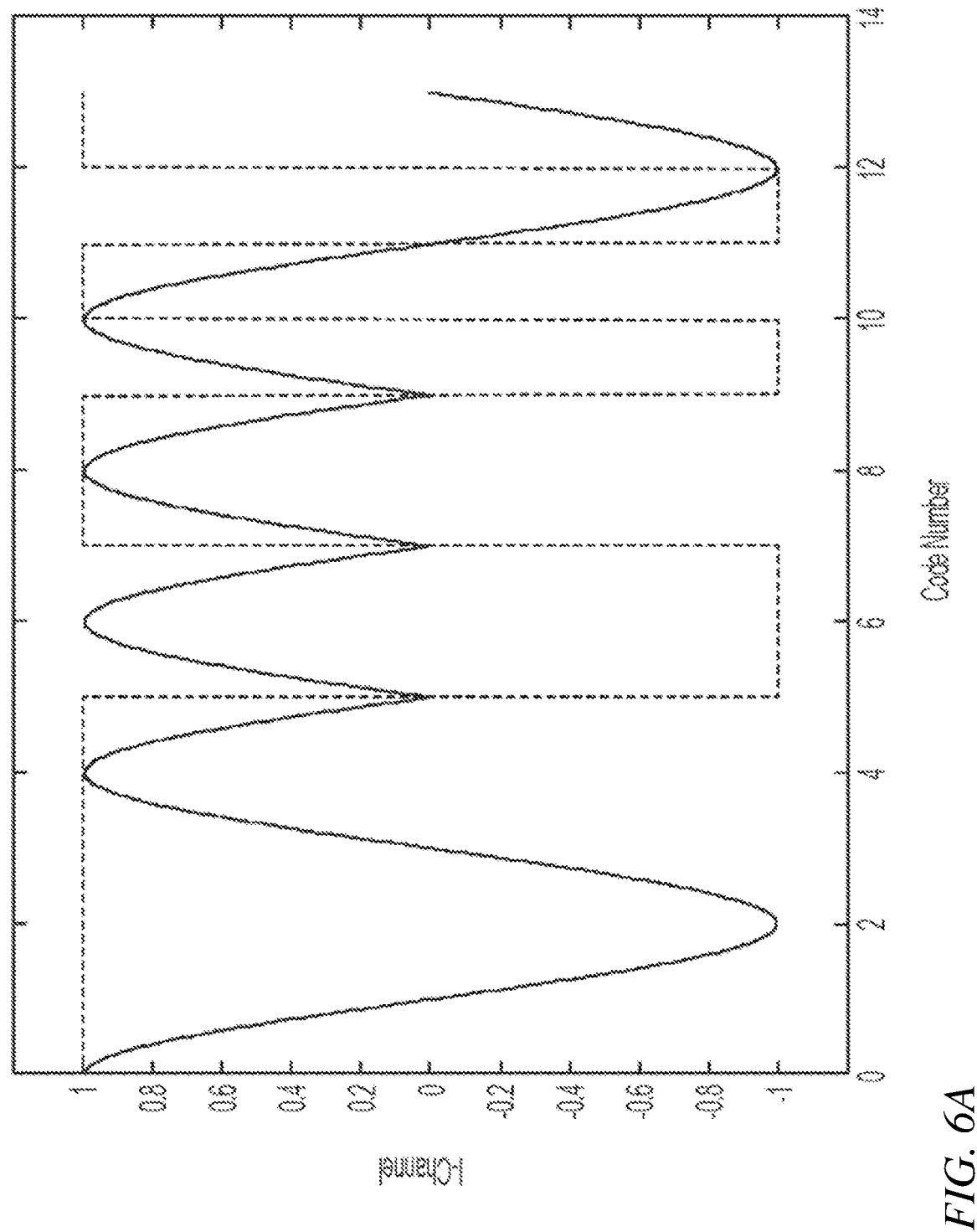
FIG. 6A is a graph of two I-channel signals, according to an embodiment of the present invention.
Figure 6B:
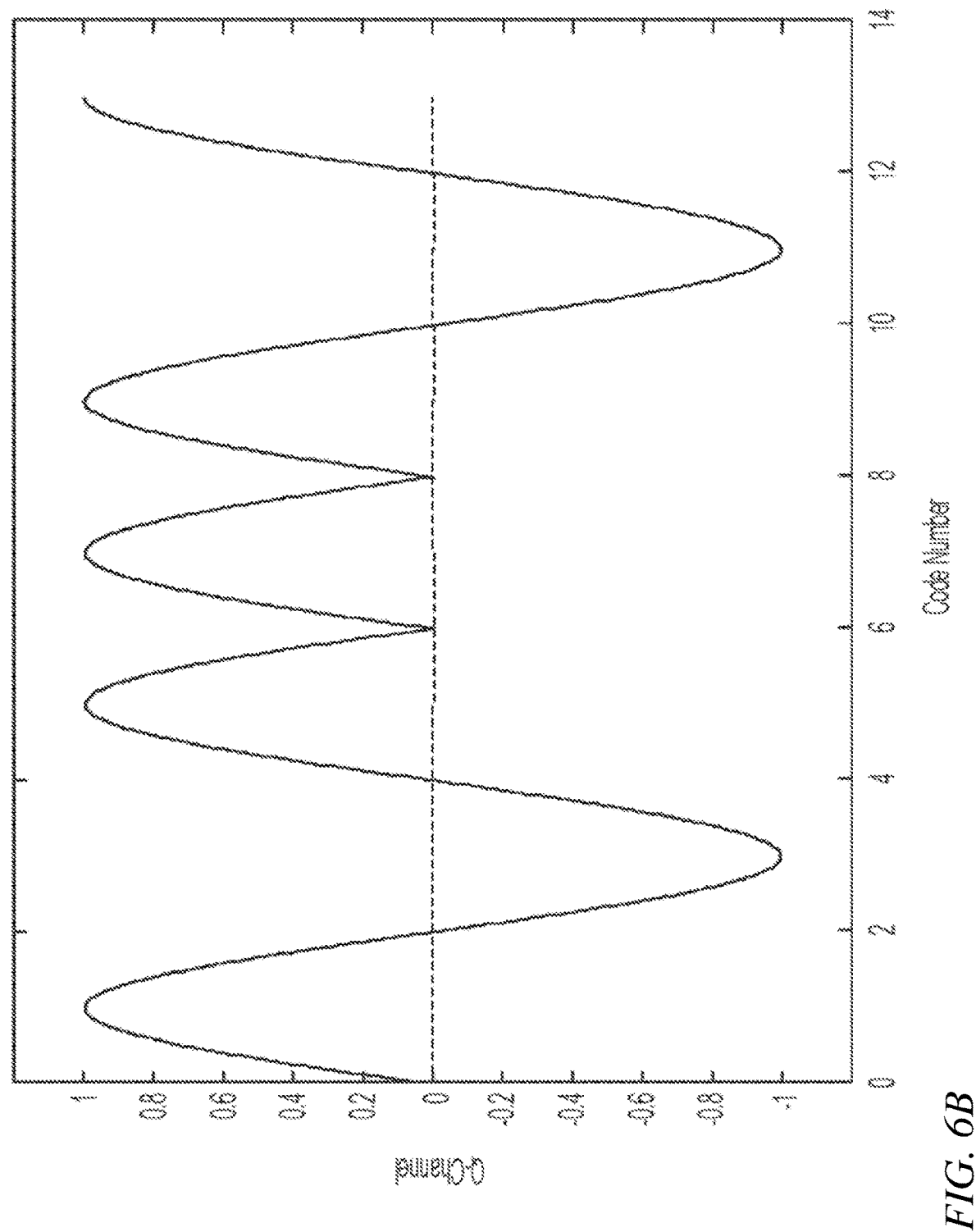
FIG. 6B is a graph of two Q-channel signals, according to an embodiment of the present invention.

FIG. 6A shows the I-channel of a carrier modulated with (i) the bi-phase modulation function of FIG. 2 and (i) the cosine of the phase modulation function of FIG. 3 (the cosine of the phase being the I-channel of a waveform modulated with the phase modulation function). FIG. 6B shows the Q-channel of a carrier modulated with (i) the bi-phase modulation function of FIG. 2 and (ii) the sine of the phase modulation function of FIG. 3 (the sine of the phase being the Q-channel of a waveform modulated with the phase modulation function).

Figure 7A:
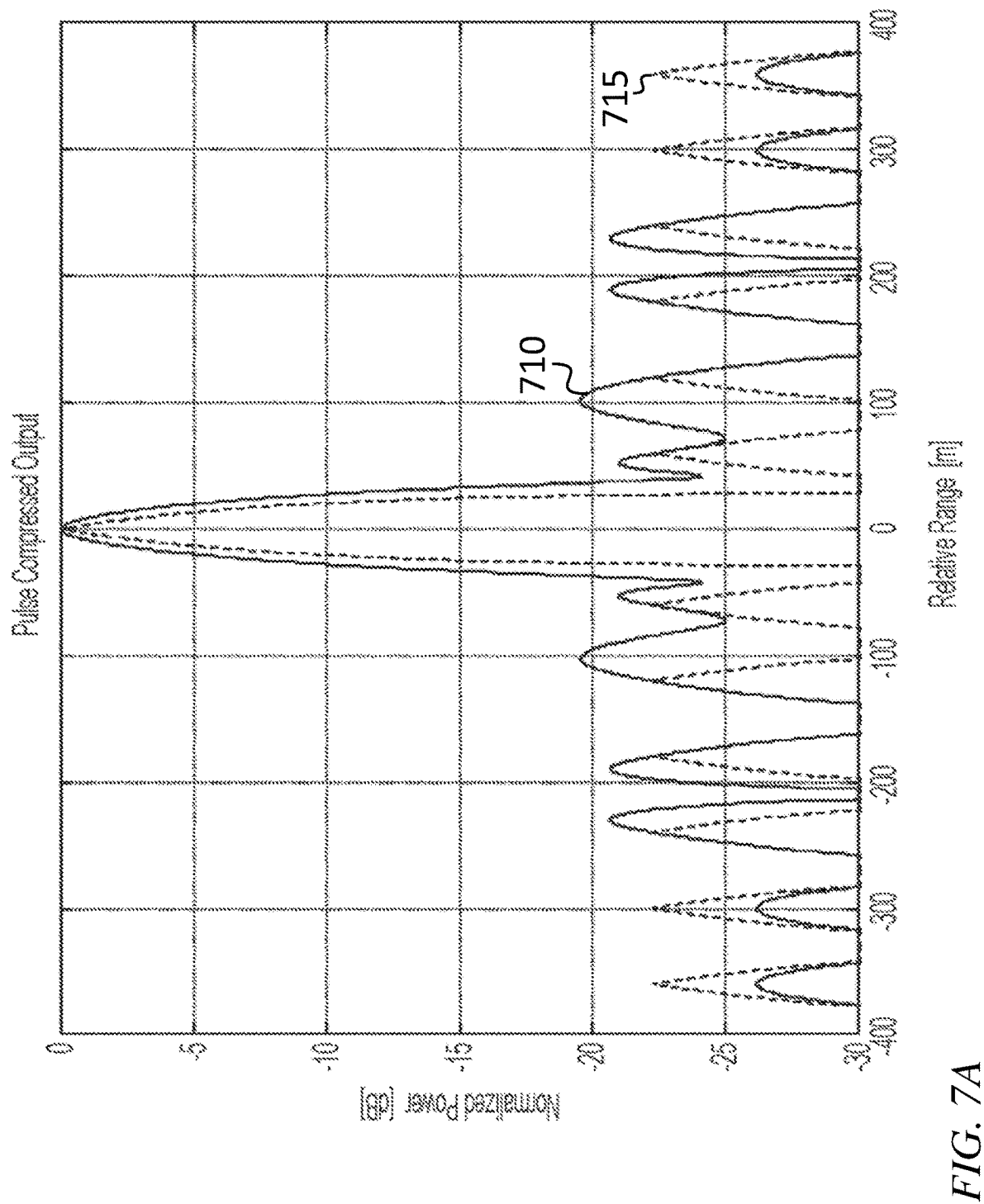
FIG. 7A is a graph of autocorrelations of two phase modulation functions, according to an embodiment of the present invention.
Figure 7B:
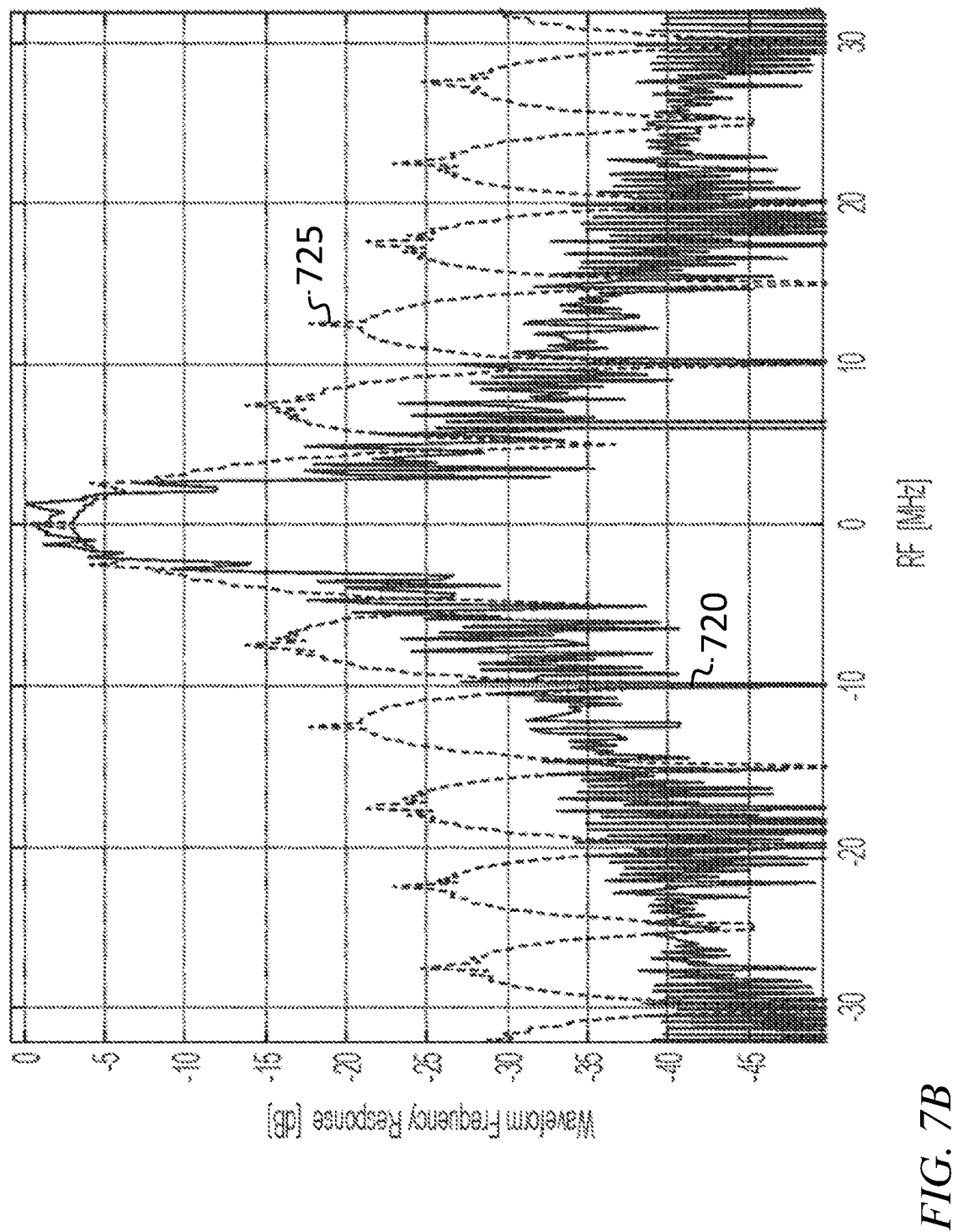
FIG. 7B is a graph of spectral responses of two phase modulation functions, according to an embodiment of the present invention.

FIG. 7A shows the autocorrelation function of (i) the quad phase modulated signal, modulated with the phase modulation function of FIG. 3 (in a first curve 710) and (ii) the Barker-13 bi-phase modulated signal, modulated with the phase modulation function of FIG. 2 (in a second curve 715). FIG. 7B shows the spectral response of (i) the quad phase modulated signal modulated with the phase modulation function of FIG. 3 (in a first curve 720) and (ii) the Barker-13 bi-phase modulated signal, modulated with the phase modulation function of FIG. 2 (in a second curve 725).

Figure 8A:
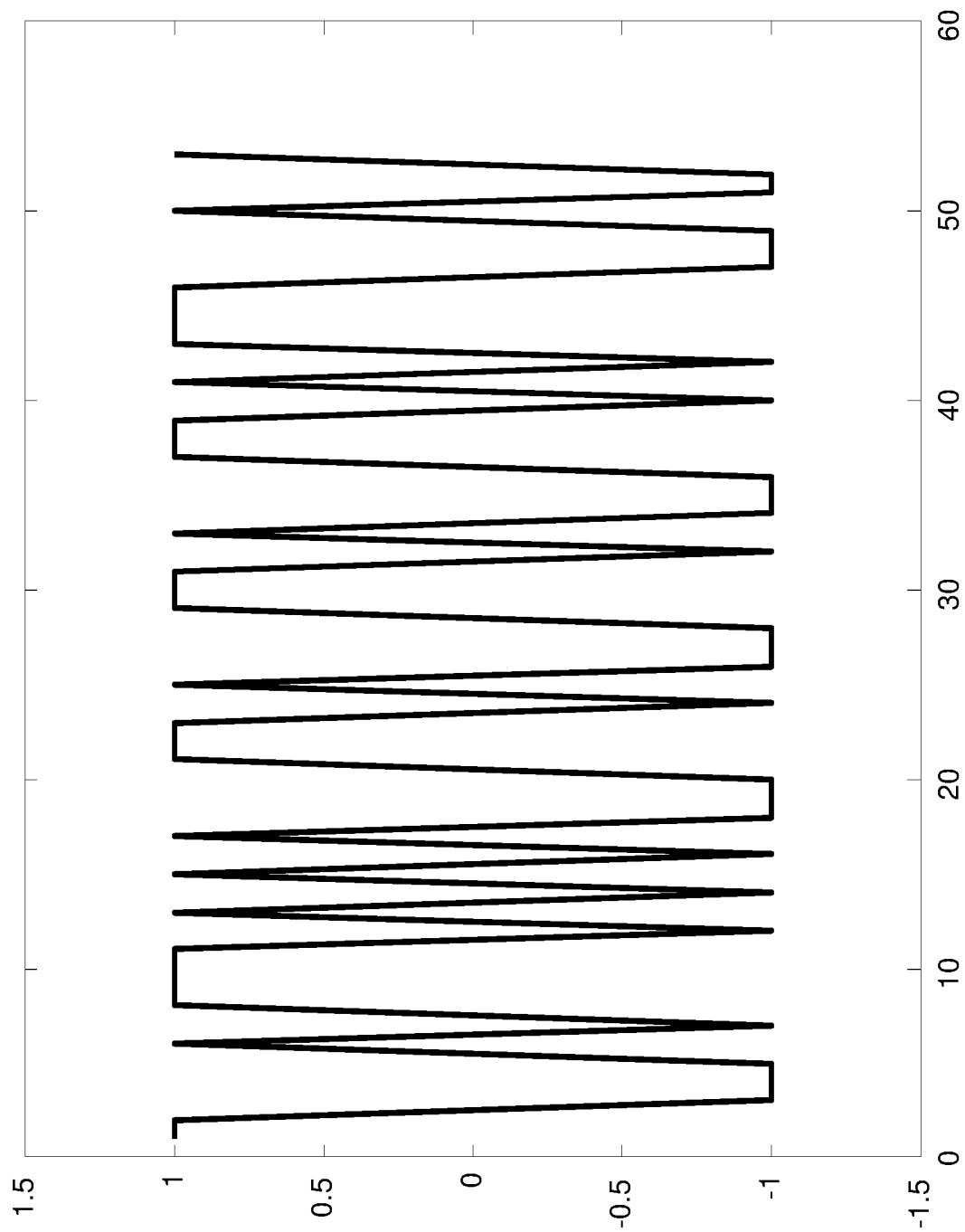
FIG. 8A is a graph of a binary code word, according to an embodiment of the present invention.
Figure 8B:
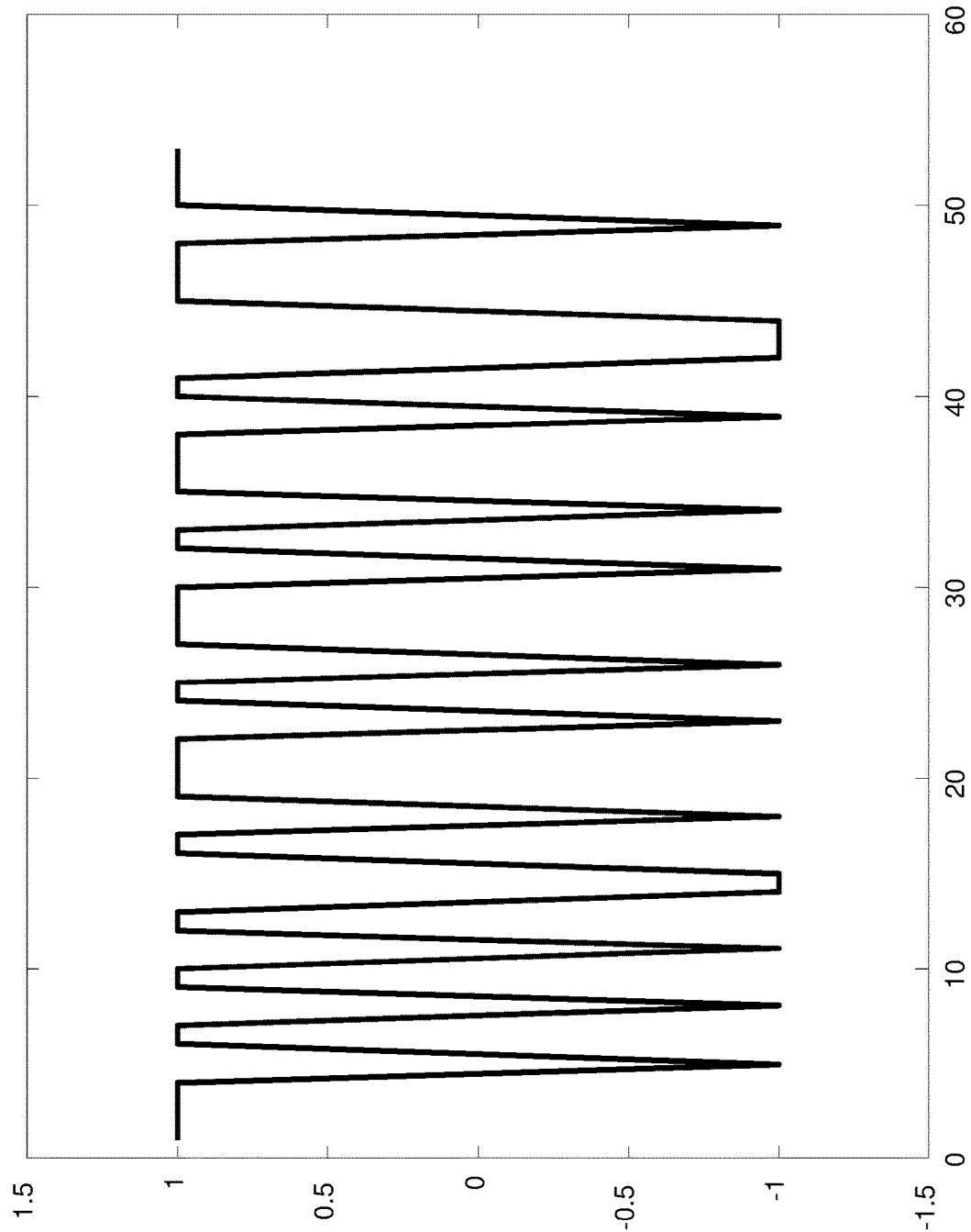
FIG. 8B is a graph of a binary code word with the sign of every even pair of bits reversed, according to an embodiment of the present invention.
Figure 8C:
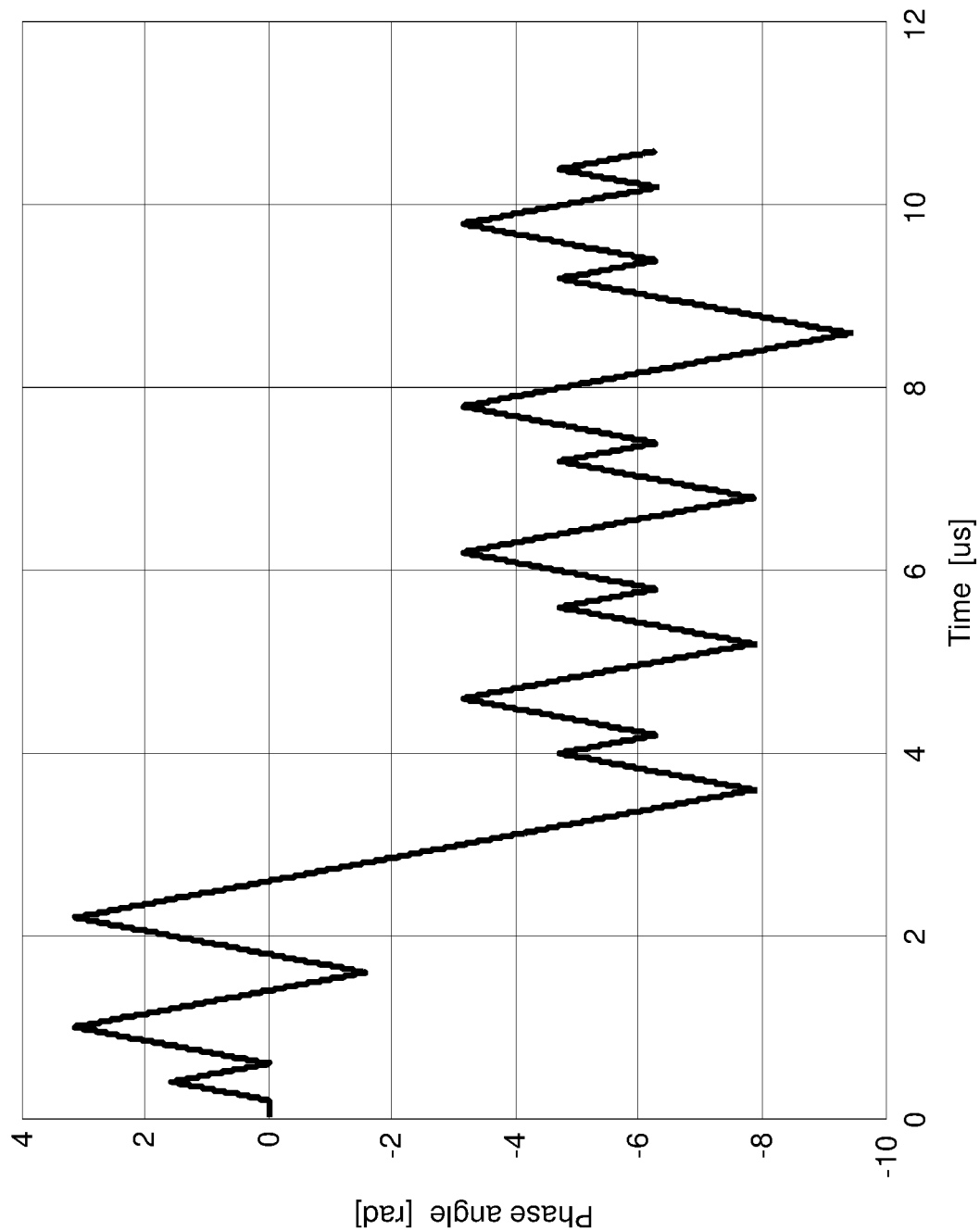
FIG. 8C is a graph of a phase modulation function, according to an embodiment of the present invention.
Figure 8D:
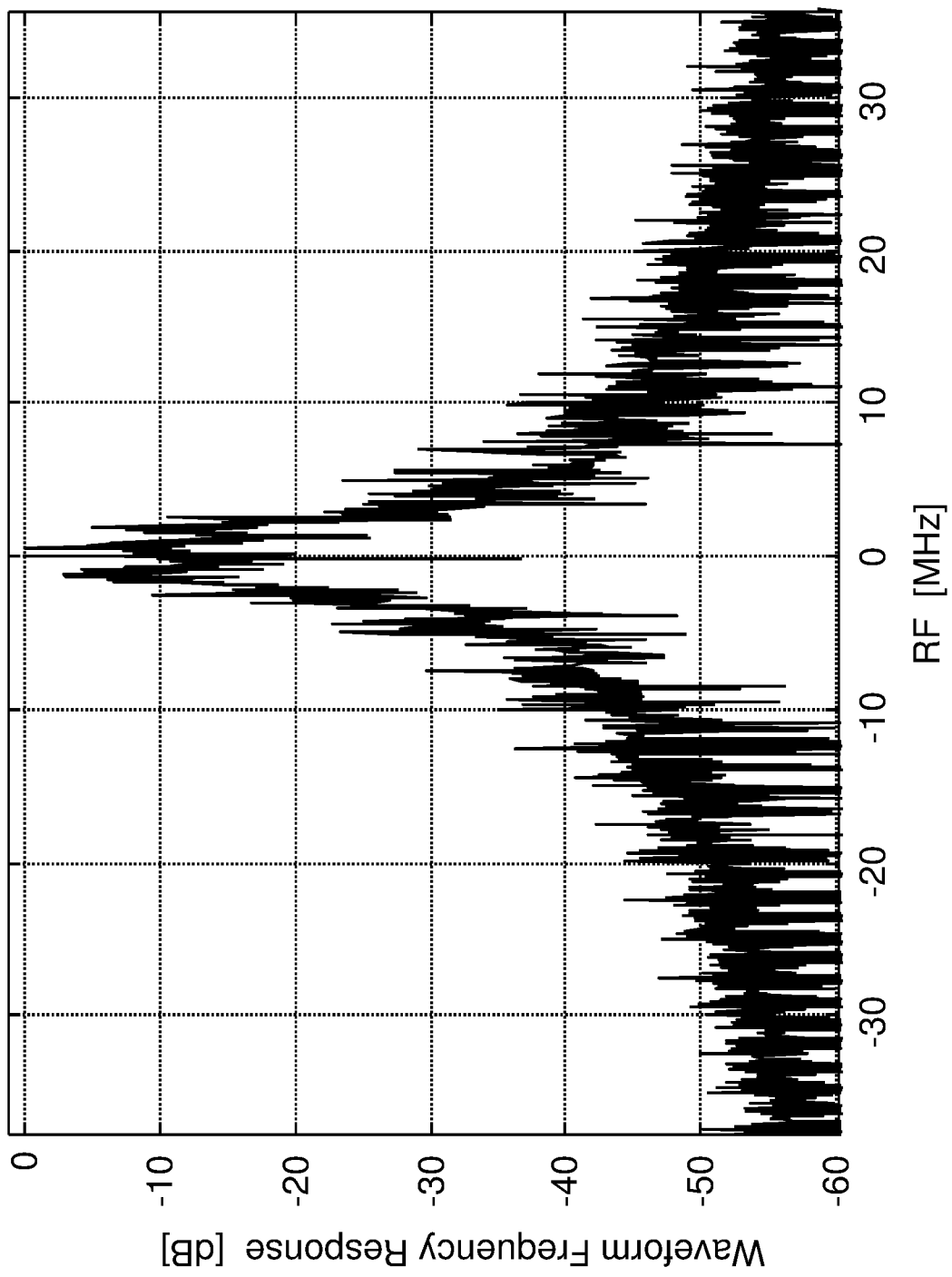
FIG. 8D is a graph of a spectral response, according to an embodiment of the present invention.

FIGS. 8A-8D show an example in which the binary code word 105 (e.g., the binary code word produced by the bi-phase code generator 575) instead of being a 13-bit Barker code, is a 53-bit pseudorandom binary code. FIG. 8A shows a graph of the binary code word, and FIG. 8B shows a graph of the binary code word with the sign of every even pair of bits reversed. FIG. 8C shows the phase modulation function that may result, at the output of a quad-phase generator such as the quad phase generator 425 of FIG. 4, when the pseudorandom binary code word is used as input, and FIG. 8D shows the spectral response of the signal of FIG. 8C. In some embodiments, the binary code word is a "fixed" binary code word (such as a Barker code, or a code generated by a pseudorandom number generator with a seed that is set at design time), i.e., it is known at design time. In some embodiments, the binary code word is not fixed, e.g., it is generated using a pseudorandom number generator with a random seed (e.g., a seed received from an external random seed source, such as system time, or a digitized analog noise source signal).

It will be understood that, except in phrases such as "first-in-order", "second-in-order", "last-in-order", and "$n^{th}$" the terms "first", "second", "third", etc., are only used to distinguish one element, component, region, layer or section from another element, component, region, layer or section. Thus, a first element, component, region, layer or section discussed herein could be termed a second element, component, region, layer or section, without departing from the scope of the present disclosure. The phrase "first-in-order" means the first one of a set of ordered things. Similarly, the phrase "second-in-order" means a thing following the "first-in-order" thing, and so on.

The term "processing circuit" is used herein to mean any combination of hardware, firmware, and software, employed to process data or digital signals. Processing circuit hardware may include, for example, application specific integrated circuits (ASICs), general purpose or special purpose central processing units (CPUs), digital signal processors (DSPs), graphics processing units (GPUs), and programmable logic devices such as field programmable gate arrays (FPGAs). In a processing circuit, as used herein, each function is performed either by hardware configured, i.e., hard-wired, to perform that function, or by more general purpose hardware, such as a CPU, configured to execute instructions stored in a non-transitory storage medium. A processing circuit may be fabricated on a single printed circuit board (PCB) or distributed over several interconnected PCBs. A processing circuit may contain other processing circuits; for example a processing circuit may include two processing circuits, an FPGA and a CPU, interconnected on a PCB.

Although limited embodiments of a quad phase generator have been specifically described and illustrated herein, many modifications and variations will be apparent to those skilled in the art. Accordingly, it is to be understood that a quad phase generator employed according to principles of this invention may be embodied other than as specifically described herein. The invention is also defined in the following claims, and equivalents thereof.

What is claimed is:

1. A system for generating a pulse, the system comprising:
a processing circuit configured to:
calculate a modified code word, the calculating of the modified code word including reversing the sign of a first group of two consecutive bits of a binary code word; and calculate three phase change bits, of a plurality of phase change bits, according to $$(-1)^n k(n)/k(n-1)$$

wherein k(n) is the $n^{th}$ bit of the binary code word, n being a positive integer ranging from 2 to 4, and generate a phase modulation function for a pulse having a sequence of consecutive chips, the phase modulation function being based on the phase change bits, the phase modulation function having:
a second phase value within a second chip of the sequence of consecutive chips, the second chip immediately following the first chip and corresponding to the second phase change bit; and
a third phase value within a third chip of the sequence of consecutive chips, the third chip corresponding to the third phase change bit, wherein:
the second phase value differs from the first phase value by a constant times the second phase change bit, and
the third phase value differs from the second phase value by the constant times the third phase change bit, the system further comprising a waveform generating circuit electrically coupled to the processing circuit, the waveform generating circuit being configured to produce a phase-modulated waveform having a phase modulation corresponding to the phase modulation function.

2. The system of claim 1, wherein the processing circuit is further configured to set a first phase change bit of the plurality of phase change bits to be equal to a first bit of the binary code word, the first phase change bit being the first-in-order phase change bit among the plurality of phase change bits, and the first bit of the binary code word being first-in-order among the bits of the binary code word.

3. The system of claim 2, wherein the first phase change bit corresponds to a first chip immediately preceding the second chip.

4. The system of claim 1, wherein the second chip is the first-in-order chip among the sequence of consecutive chips.

5. The system of claim 1, wherein the binary code word is a fixed binary code word.

6. The system of claim 1, wherein the binary code word is a pseudorandom noise code.

7. The system of claim 1, wherein the waveform generating circuit comprises a cosine table.

8. The system of claim 1, wherein the processing circuit is further configured to generate the phase modulation function as a plurality of phase values within each chip, the phase values forming a sequence approximating a continuous monotonic function within the first chip, a point on the continuous monotonic function within the first chip being equal to the first phase value.

9. The system of claim 8, wherein the continuous monotonic function is a piecewise linear function.

10. The system of claim 9, wherein the continuous monotonic function is a linear function.

11. The system of claim 1, wherein the waveform generating circuit comprises:
a carrier tone generator;
a phase shifter; and
a controllable phase interpolator, configured to be controlled by the processing circuit.

12. A method, executed by one or more electronic processing circuits, for generating an electronic quad phase modulated waveform, the method comprising:
receiving a first group of two consecutive bits of a binary code word having a sign, by an electronic receiver;
reversing the sign of the first group of two consecutive bits of the binary code word; and
calculating, by the one or more electronic processing circuits, three phase change bits, of a plurality of phase change bits, according to $$(-1)^n k(n)/k(n-1)$$

wherein k(n) is the $n^{th}$ bit of the binary code word, n being a positive integer ranging from 2 to 4, and
generating a phase modulation function, by a waveform generation circuit, for an electronic pulse comprising a sequence of consecutive chips, the phase modulation function being based on the phase change bits, the phase modulation function having:
a second phase value within a second chip of the sequence of consecutive chips, the second chip immediately following the first chip and corresponding to the second phase change bit; and
a third phase value within a third chip of the sequence of consecutive chips, the third chip corresponding to the third phase change bit, wherein:
the second phase value differs from the first phase value by a constant times the second phase change bit, and
the third phase value differs from the second phase value by the constant times the third phase change bit.

13. The method of claim 12, further comprising setting a first phase change bit of the plurality of phase change bits to be equal to a first bit of the binary code word, the first phase change bit being first-in-order among the plurality of phase change bits, and the first bit of the binary code word being first-in-order among the bits of the binary code word.

14. The method of claim 13, wherein the first phase change bit corresponds to a first chip immediately preceding the second chip.

15. The method of claim 12, wherein the second chip is the first-in-order chip among the sequence of consecutive chips.

16. The method of claim 12, wherein the binary code word is a Barker binary code word.

17. The method of claim 12, wherein the binary code word is a pseudorandom noise code.

18. The method of claim 12, further comprising generating the phase modulation function as a plurality of phase values within each chip, the phase values forming a sequence approximating a continuous monotonic function within the first chip, a point on the continuous monotonic function within the first chip being equal to the first phase value.

19. The method of claim 18, wherein the continuous monotonic function is a piecewise linear function.

20. The method of claim 19, wherein the continuous monotonic function is a linear function.

* * * * *